US005800798A

United States Patent [19]
Ino et al.

[11] Patent Number: 5,800,798
[45] Date of Patent: Sep. 1, 1998

[54] PROCESS FOR PRODUCING FUEL GAS FOR FUEL CELL

[75] Inventors: Takashi Ino; Tadashi Seike, both of Yokohama, Japan

[73] Assignees: Nippon Oil Co., Ltd; Petroleum Energy Center, both of Tokyo, Japan

[21] Appl. No.: 670,328

[22] Filed: Jun. 25, 1996

Related U.S. Application Data

[63] Continuation of Ser. No. 315,762, Sep. 30, 1994, abandoned, which is a continuation-in-part of Ser. No. 42,333, Apr. 2, 1993, abandoned.

[30] Foreign Application Priority Data

Apr. 6, 1992 [JP] Japan ................................ 4-112338

[51] Int. Cl.$^6$ .................................................. C01B 3/26
[52] U.S. Cl. ................ 423/654; 502/400; 502/406; 48/198.7; 48/211; 423/652
[58] Field of Search ...................... 423/654; 502/400, 502/406; 48/198.7

[56] References Cited

U.S. PATENT DOCUMENTS

| 4,923,836 | 5/1990 | Kokayeff et al. | 502/74 |
| 5,026,536 | 6/1991 | Shioiri et al. | 423/654 |
| 5,130,115 | 7/1992 | Fujisou et al. | 423/654 |

*Primary Examiner*—Tae Yoon
*Attorney, Agent, or Firm*—Bucknam and Archer

[57] ABSTRACT

A process of producing a fuel gas for fuel cells, which comprises the steps of: a) treating kerosine having a sulfur content not higher than 5 ppm with a desulfurizing agent to reduce the sulfur content of said treated kerosine to 0.2 ppm or less and b) contacting said treated kerosine from step a) with a steam reforming catalyst to provide a fuel gas mainly composed of hydrogen, said desulfurizing agent in step a) comprising a copper-nickel alloy having a copper to nickel ratio by weight of 80:20 to 20:80 and at least one carrier selected from the group consisting of $Al_2O_3$, ZnO and MgO, and the total content of copper and nickel in terms of metals in said desulfurizing agent being in the range of 40 to 70% by weight.

21 Claims, No Drawings

PROCESS FOR PRODUCING FUEL GAS FOR FUEL CELL

This is a Continuation, of application Ser. No. 08/315,762, filed Sep. 30, 1994, which is a CIP of application Ser. No. 08/042,333, filed Apr. 2, 1993, both abandoned.

FIELD OF THE INVENTION

The present invention relates to a process for producing a fuel gas for fuel cells from a hydrocarbon, and particularly to a process for producing a fuel gas for fuel cells from a heavy hydrocarbon, such as kerosine, in the presence of a desulfurizing agent which is less liable to bring about the deposition of carbon even at a relatively high temperature and has a high service life.

BACKGROUND OF THE PRIOR ART

Fuel cells are under examination on the feasibility for a power generation device for domestic or industrial uses on a demonstration plant scale by virtue of their advantages such as a high energy conversion efficiency and a low liability to cause environmental deterioration, and the establishment of the technique for using the fuel cells is expected in various fields.

The fuel cells are roughly classified into three types according to the difference in the electrolyte, that is, phosphoric acid type, fused carbonate type and solid oxide type fuel cells. At the present time, the phosphoric acid type fuel cells are thought to be in the position closest to practical use. However, the fused carbonate type and solid oxide type fuel cells are superior to the phosphoric acid type fuel cells in the energy conversion efficiency, effective use of waste heat and variety of usable fuels.

In each of the above-described fuel cells, a gas mainly composed of hydrogen is used as the fuel. In the case of the phosphoric acid type fuel cells, if the fuel gas contains carbon monoxide, the performance of the electrode is deteriorated, so that the carbon monoxide should be removed prior to the supply of the fuel gas to the body of the cell. In general, a CO conversion reaction is utilized for removing carbon monoxide, and the carbon monoxide is rendered harmless as carbon dioxide. In the fused carbonate type fuel cells, there is no need of removing carbon monoxide from the fuel gas. In the solid oxide type fuel cells, on the contrary, carbon monoxide and further light hydrocarbons are usable as a fuel like hydrogen.

Regarding the production of hydrogen to be used in the fuel cells, taking technical accessibility into consideration, studies are in progress mainly on a process for producing hydrogen by steam reforming a natural gas mainly composed of methane or a town gas mainly composed of a natural gas and a process for producing hydrogen by reforming or cracking methanol.

The fuel cells wherein use is made of a natural gas or a town gas are available, but, only in those areas where a pipeline for such a gas is provided, so that the utilization of the fuel cells are regionally limited to a great extent. Further, on the occasion of occurrence of large-scale disasters, such as earthquake, there is a considerably high possibility that the breaking of the pipeline for a town gas will shut off the gas. On the other hand, the process comprising the reforming or cracking of methanol to obtain hydrogen has a drawback that the material unit per hydrogen is considerably higher than the case of the natural gas.

If kerosene commercially available through a nationwide distribution network becomes usable as a starting material for providing hydrogen for fuel cells, the starting material can be fed to any place of the country. Further, on the occasion of occurrence of earthquake, if the fuel cell is operable, the power generation can be continued by utilizing kerosene stocked in the area concerned. Further, the use of kerosene is advantageous because the material unit for the production of hydrogen is lower than that of the natural gas, thus reducing the power generation cost.

In the plants where hydrogen is produced by steam reforming, light hydrocarbons, such as off-gas, natural gas, LPG or naphtha, have hitherto been used as the starting material, and the use of heavier hydrocarbons, such as kerosene, as the starting material has been regarded as difficult. This is mainly because kerosene presents greater difficulty in the desulfurization than natural gas, LPG and naphtha. A steam reforming catalyst is so sensitive to sulfur that the presence of even a very small amount of sulfur gives rise to a lowering in the catalytic activity. For this reason, in order to use the hydrocarbon as a starting material to be applied to steam reforming, the hydrocarbon should be desulfuirized to such a great extent that the sulfur content in the hydrocarbon as the starting material is 0.2 ppm or less, preferably 0.1 ppm or less.

However, in the case of JIS No. 1 kerosene (so-called illuminating kerosene) as stipulated in JIS K 2203 (hereinafter referred to as "JIS No. 1 kerosene") and supplied for general heating purposes, a sulfur content up to 150 ppm is tolerated, and commercially available kerosene has a sulfur content of about 20 to 60 ppm on the average. Therefore, when the use of the JIS No. 1 kerosene as the fuel source for the fuel cell is intended, the sulfur content in the kerosene should be lowered to 0.2 ppm or less.

Petroleum products are usually desulfurized by making use of a Co-Mo-based or Ni-Mo-based catalyst in the presence of hydrogen under high temperature and high pressure conditions. In order to lower the sulfur content in the JIS No. 1 kerosene to 0.2 ppm or less by such a hydrodesulfurization process, the desulfurization should be conducted under a pressure as high as 20 to 100 kg/cm$^2$ G.

Since, however, the power generation making use of the fuel cells is generally conducted on a smaller scale than the usual power generation conducted by electric power companies, it is impossible to provide a large-scale desulfuirization equipment for the fuel cells. In particular, in the case of distributed fuel cells having an output of 500 kW or less, it is anticipated that they are installed in locations in the vicinity of buildings or basements. In this case, the desulfurization reaction should be conducted under a pressure of less than 10 kg/cm$^2$ G in view of the safety and environment in the neighborhood areas and also from the viewpoint of the related laws and regulations, particularly the High Pressure Gas Control Law. When the JIS No. 1 kerosene is hydrodesulfurized under the above-described condition, the sulfur content can be lowered to 5 ppm or less, but it is difficult to lower the sulfur content to 0.2 ppm or less constantly. For this reason, in order to lower the sulfur content in the kerosene to 0.2 ppm or less, a kerosene should be hydrodesulfurized and further treated with a desulfurizing agent.

For this point of view, Japanese Patent Application Laid-Open Gazettes Nos. Hei.1-188404 (188404/1989), Hei.1-188405 (188405/1989) and Hei.1-188406 (188406/1989) propose a process for producing hydrogen by steam reforming a kerosene desulfurized with a nickel-based desulfurizing agent. In this case, however, the temperature at which the desulfurization can be successfully conducted is in the range of from 150° to 300° C. When the temperature exceeds 300°

C., the deposition of carbon becomes so significant that the pressure drop in the desulfurization section becomes large thereby raising difficulties of the operation. Since, however, the inlet temperature of a steam reforming device located at the latter stage of the desulfurization apparatus is 400° to 500° C., it is preferred that the desulfurization temperature be close to this temperature from the viewpoint of the process. Further, Japanese Patent Application Laid-Open Gazettes Nos. Hei.2-302302 (302302/1990) and Hei.2-302303 (302303/1990) propose a fuel cell power generation system using a copper-zinc-based desulfurizing agent. The copper-zinc-based desulfurizing agent is less liable to bring about the deposition of carbon. Since, however, the desulfurization activity of the copper-zinc-based desulfurizing agent is lower than that of nickel, it is unsatisfactory for use in the desulfurization of kerosene although light hydrocarbons, such as natural gas, LPG or naphtha, can be successfully desulfurized with this desulfurizing agent.

SUMMARY OF THE INVENTION

An object of the present invention is to provide a process for producing a fuel gas for fuel cells, which comprises treating a hydrocarbon with a desulfurizing agent which is less liable to bring about the deposition of carbon even at a relatively high temperature and has a high desulfurizing capability and further steam reforming the hydrocarbon thus treated.

The present inventors have made intensive studies with a view to preventing the deposition of carbon and improving the desulfurizing capability in the desulfurizing process for a hydrocarbon and, as a result, have found that this object can be attained by using a specific desulfurizing agent. The present invention has been made based on this finding.

The present invention resides in a process of producing a fuel gas for fuel cells, which comprises the steps of: a) treating kerosene having a sulfur content not higher than 5 ppm with a desulfurizing agent to reduce the sulfur content of said treated kerosene to 0.2 ppm or less and b) contacting said treated kerosene from step a) with a steam reforming catalyst to provide a fuel gas mainly composed of hydrogen, said desulfurizing agent in step a) comprising a copper-nickel alloy having a copper to nickel ratio by weight of 80:20 to 20:80 and at least one carrier selected from the group consisting of $Al_2O_3$, ZnO and MgO, and the total content of copper and nickel in terms of metals in said desulfurizing agent being in the range of 40 to 70% by weight.

The present invention will be described in more detail.

In the process according to the present invention, a hydrocarbon is desulfurized with a specific desulfurizing agent and then steam reformed to produce a fuel gas for fuel cells.

The hydrocarbons to be used in the present invention are not particularly limited, and they are exemplified by natural gas, city gas mainly composed of natural gas, LPG, naphtha and kerosene. The process of the present invention can attain superiority with respect to the conventional processes when naphtha or kerosene is used among the above-described hydrocarbons. The superiority is particularly high when kerosene is used. The sulfur content in the hydrocarbon to be used is not particularly limited, but it is preferably in the range of more than 0.2 ppm to at most 5 ppm. When a hydrocarbon having a sulfur content exceeding 5 ppm is treated with the desulfurizing agent according to the present invention, the service life of the desulfurizing agent is so short that the desulfurizing agent should be frequently replaced.

In order to use the hydrocarbon having a sulfur content exceeding 5 ppm as the starting material, it is advantageous that the hydrocarbon be previously hydrodesulfurized to lower the sulfur content to 5 ppm or less. In general, this can be attained by hydrodesulfurization under a high pressure in the presence of a Ni-Mo-based or Co-Mo-based catalyst. The hydrodesulfurization is conducted under the reaction conditions of a temperature in the range of from 50° to 400° C., a pressure in the range of from 10 to 100 $kg/cm^2$ and a LHSV (liquid hourly space velocity) in the range of from 0.1 to 10. When a conventional kerosene is used as the starting material, the hydrodesulfurization is conducted under particular reaction conditions of temperature in the range of from 300° to 400° C., pressure in the range of from 10 to 100 $kg/cm^2$ and a LHSV in the range of from 0.1 to 1.

In the case of a fuel cell system provided with, as the desulfurizers, both a hydrodesulfurizer and an apparatus using a desulfurizing agent, a hydrocarbon with a high a sulfur content can be directly used as the starting material for the fuel cell system. Therefore, it is also possible to use the JIS No. 1 kerosene. In this case, however, it is advantageous to set the operation conditions of the hydrodesulfurizer so that the sulfur content in the hydrocarbon becomes 5 ppm or less at the outlet of the hydrodesulfurizer and at the inlet of the apparatus using a desulfurizing agent.

The specific desulfurizing agent according to the present invention removes sulfur present in a very small amount in the hydrocarbon through sorption. The desulfurizing agent to be used for the present invention comprises an alloy of copper with nickel and has a copper to nickel weight; ratio in terms of metals in the range of from 80:20 to 20:80, preferably 70:30 to 30:70. It is preferred that the heavier the hydrocarbon to be treated, the higher the proportion of nickel. However, it is to be noted that when the proportion of nickel exceeds 80, the deposition of carbon is increased in the desulfurization at a relatively high temperature in the range of from 300° to 400° C. On the other hand, when the proportion of nickel is less than 20, the desulfurizing capability is unsatisfactory for the desulfurization of heavy hydrocarbons such as kerosene.

Copper and nickel contained in the desulfurizing agent are supported on a carrier. The carrier is at least one selected from the group consisting of $Al_2O_3$, ZnO and MgO. These carriers may be used alone or in the form of a mixture of two or more of them. The use of these carriers contributes to an improvement in the dispersibility of the copper-nickel alloy in the desulfurizing agent, an enhancement in the desulfurizing capability and, at the same time, prolongation of the service life as the desulfurizing agent. There is no particular limitation on the method for supporting copper and nickel on the carrier, and they can be supported, for example, by impregnation, coprecipitation, deposition, gel kneading, pore filling, etc. The total content of copper and nickel in the desulfurizing agent is in the range of from 40 to 70% by weight, more preferably in the range of from 40 to 50% by weight, in terms of metals, based on the total weight of the desulfurizing agent. In a case where the total content of copper and nickel (in terms of metals) in the desulfurizing agent is less than 40% by weight based on the total weight of the desulfurizing agent, the service life is quite inferior to that achieved by the desulfurizing agent of the present invention. The desulfurizing agent is preferably used in the form of a molded article with the consideration of the relationship with the pressure drop, and the molded article is preferably one comprising particles having a diameter regulated to about 0.5 to 10 mm by tablet molding, extrusion molding, balloon molding, crush molding, or the like.

Further, the desulfurizing agent preferably has a bulk density in the range of from 0.5 to 2 g/ml, a surface area in the range of from 10 to 400 m$^2$/g and a pore volume in the range of from 0.1 to 1.5 ml/g.

The desulfurization of the hydrocarbon in the presence of the above-described desulfurizing agent according to the present invention is preferably conducted under the conditions of temperature in the range of from 50° to 400° C., pressure in the range of from atmospheric pressure to 10 kg/cm$^2$ G and a LHSV value in the range of from 0.1 to 10. In particular, when kerosene is used as the hydrocarbon, the desulfurization is preferably conducted under the conditions of temperature in the range of from 200° to 400° C., preferably in the range of from 300° exclusive to 400° C., pressure in the range of from atmospheric pressure to 10 kg/cm$^2$ G and a LHSV value in the range of from 0.1 to 1. The sulfur content in the hydrocarbon desulfurized according to the present invention should be 0.2 ppm or less, preferably 0.1 ppm or less. When the hydrocarbon having a sulfur content exceeding 0.2 ppm is fed to the steam reforming catalyst in the latter stage, the steam reforming catalyst deteriorates in a short period of time due to sulfur poisoning, which obstructs stable operation of the fuel cell system. For this reason, the reaction conditions in the desulfurization should be set so that the sulfur content is reduced to 0.2 ppm or less.

In the process according to the present invention, the hydrocarbon desulfurized with the desulfurizing agent to a sulfur content of 0.2 ppm or less is then transferred to a steam reforming column, where the hydrocarbon is reformed into a gas composed mainly of hydrogen. The steam reforming catalyst may comprise a nickel-based catalyst when the steam to carbon ratio is 3.5 or more. However, when the power generation efficiency of the fuel cell is taken into consideration, a suitable steam to carbon ratio is in the range of from 2 to 3, so that the use of a noble metal-based catalyst is preferred for the steam reforming under such conditions. Ruthenium-based and rhodium-based catalysts are particularly excellent as the noble metal-based catalyst.

The steam reforming is conducted under the reaction conditions of a catalyst bed inlet temperature in the range of from 350° to 500° C., a catalyst bed outlet temperature in the range of from 650° to 800° C., a pressure in the range of from atmospheric pressure to 10 kg/cm$^2$ G and a LHSV value in the range of from 0.1 to 10. In particular, when kerosene is used as the hydrocarbon, the steam reforming is conducted under the reaction conditions of a catalyst bed inlet temperature in the range of from 400° to 500° C., a catalyst bed outlet temperature in the range of from 700° to 800° C., a pressure in the range of from atmospheric pressure to 10 kg/cm$^2$ G and a LHSV value in the range of from 0.1 to 1.

The gas emerged from the steam reforming device comprises, on a dry basis, 60 to 80% by volume of hydrogen and 10 to 30% by volume of carbon monoxide.

When the fuel cell 5s a phosphoric acid type fuel cell, the reformed gas is further treated with a carbon monoxide conversion catalyst to convert carbon monoxide into carbon dioxide, which is then fed to the body of the cell. On the other hand, when the fuel cell is a fused carbonate type or solid oxide type fuel cell, the reformed gas may be fed directly to the body of the cell.

As described above, according to the process of the present invention, a fuel gas for a fuel cell mainly composed of hydrogen can be stably produced for a long period time even when a heavy hydrocarbon having a high sulfur content, such as kerosene, is used as the starting material.

DESCRIPTION OF THE PREFERRED EMBODIMENTS

The present invention will be described in more detail with reference to the following Examples, but the present invention is not limited to the embodiments described in these Examples.

EXAMPLE 1

(1) Preparation of a desulfurizing agent comprising a copper-nickel alloy:

Purified water (deionized water) was added to 58 g of copper nitrate, 69.8 g of nickel nitrate, 116.6 g of zinc nitrate and 60 g of aluminum nitrate to prepare 1000ml of a solution. Separaitely, 105 g of sodium carbonate was dissolved in purified water to prepare 2000 ml of a solution. The resultant aqueous sodium carbonate solution was gradually added to the aqueous metallic nitrate solution with stirring to form a precipitate. When the pH value reached 7, the addition of the aqueous sodium carbonate solution was stopped. In this state, the stirring was continued for additional one hour to mature the precipitate. Thereafter, the precipitate was collected by filtration to obtain a precipitated cake.

The cake was washed several times with 1wt.% aqueous ammonium bicarbonate solution to remove sodium and then dried at 110° C. for 24 hours. The dried cake was pulverized and fired at 400° C. for one hour in the air. The powder as fired was molded into a tablet having a size of 5 mm$\phi \times$5 mm. The molded article was crushed to a size of about 2 to 3 mm, packed into a desulfurization tube, heated in a hydrogen stream with caution so as not to cause heat buildup and reduced at 200° C. for 16 hours.

The desulfurizing agent thus produced comprised 22% by weight of Cu, 21% by weight of Ni, 46% by weight of ZnO and 11% by weight of Al$_2$O$_3$ and had a surface area of 98 m$^2$/g.

(2) JIS No. 1 kerosene:

A commercially available kerosene (JIS No. 1 kerosene: so-called illuminating kerosene) having the following properties was used as the starting material:

sulfur content: 32 ppm, specific gravity (15/4° C.): 0.798, boiling range: 165°–265° C., aromatic compound content: 20.3% by volume, and smoke point: 25 mm.

(3) Hydrodesulfurization of the JIS No. 1 kerosene:

The JIS No. 1 kerosene having the properties described in the above item (2) was desulfurized in a hydrodesulfurizer comprising a commercially available hydrodesulfurization catalyst. (NiO: 5% by weight, MoO$_3$:20% by weight, Al$_2$O$_3$:75% by weight) and zinc oxide to provide a hydrodesulfurized kerosene having a sulfur content of 2 ppm. The hydrodesulfurization was conducted under the conditions of a reaction temperature of 380° C., a pressure of 10kg/cm$^2$ G and a LHSV value of 1.

(4) Desulfurization of the JIS No. 1 kerosene hydrodesulfurized:

The kerosene hydrodesulfurized in the above item (3) was further desulfurized in the presence of the catalyst comprising a copper-nickel alloy prepared in the above item (1). The desulfurization was conducted under the reaction conditions of a temperature of 380° C., a pressure of 9kg/cm$^2$ G, a LHSV value of 1 and hydrogen to kerosene ratio of 100 ml/g (an entraining gas composition of 74% by volume of H$_2$, 1% by volume of CO, 1% by volume of CH$_4$ and 24% by volume of CO$_2$). In the desulfurization, a stainless tube having an internal diameter of 20 mm was used as the desulfurization tube and packed with 40 ml of the desulfurizing agent. The sulfur content in the kerosene at the outlet of the tube was lower than the detection limit (0.05 ppm) in a period from the initiation of the passing of the kerosene through the tube to 3000 hours after the initiation of the passing of the kerosene through the tube. Thereafter, the sulfur content gradually increased, and amounted to about 0.1 ppm about 7000 hours after the initiation of the passing of the kerosene through the tube.

(5) Steam reforming test:

The kerosene desulfurized in the above item (4) was steam reformed in the presence of a ruthenium catalyst (Ru: 1% by weight, $Al_2O_3$: 79% by weight, and $CeO_2$: 20% by weight).

Specifically, the catalyst used had a spherical shape having a diameter of 5 mm, and 40 ml of this catalyst was packed into a stainless steel reaction tube having an internal diameter of 20 mm. The steam reforming was conducted under the reaction conditions of a catalyst bed inlet temperature of 450° C., a catalyst bed outlet temperature of 750° C., atmospheric pressure, a LHSV value of 1, a hydrogen to kerosene ratio of 100 ml/g and a steam to carbon ratio of 3. Even after the lapse of 5000 hours from the initiation of the reaction, 100% of the kerosene could be reformed and the composition of the gas at the outlet was close to the thermodynamic equilibrium value. Further, no increase in the pressure drop was observed in the catalyst bed.

COMPARATIVE EXAMPLE 1

40 ml of a commercially available copper-based desulfurizing agent (CuO: 36% by weight, ZnO: 47% by weight, $Al_2O_3$: 15% by weight, tablet having a size of ¼ in. diam.×⅛ in. length, surface area: 68 m²/g) crushed to a size of about 2 to 3 mm was packed into a reaction tube and heated in a hydrogen stream with caution so as not to cause heat buildup and reduced at 200° C. for 16 hours.

The hydrodesulfurized kerosene produced in the item (3) of Example 1 was desulfurized with this desulfurizing agent. The desulfurization conditions were the same as those described in the item (4) of Example 1. The sulfur content in the kerosene at the outlet was 0.1 ppm from the initiation of the passing of the kerosene through the tube, and amounted to 0.3 ppm 500 hours after the initiation of the passing of the kerosene and 0.5 ppm 1000 hours after the initiation of the passing of the kerosene.

COMPARATIVE EXAMPLE 2

40 ml of a commercially available nickel-based desulfurizing agent (Ni: 34.4% by weight, tablet having a size of ⅛ in. diam. ×1/16 in. length, surface area: 147 m²/g) crushed to a size of about 2 to 3 mm was packed into a reaction tube and heated in a hydrogen stream with caution so as not to cause heat buildup and reduced at 200° C. for 16 hours.

The hydrodesulfurized kerosene produced in the item (3) of Example 1 was desulfurized with this desulfurizing agent. The desulfurization conditions were the same as those described in the item (4) of Example 1. The pressure drop in the catalyst bed began to increase from the initiation of the passing of the kerosene through the tube, and amounted to 1 kg/cm² 200 hours after the initiation of the passing of the kerosene. At this point of time, the reaction was ceased. During the operation, the sulfur content in the kerosene at the outlet was lower than the detection limit.

EXAMPLE 2

(1) Preparation of a sorption-desulfurizing agent comprising a copper-nickel alloy:

Purified water was added to 26.6 g of copper nitrate, 104 g of nickel nitrate, 127.9 g of zinc nitrate and 51.5 g of aluminum nitrate to prepare 1000 ml of a solution. Separately, 105 g of sodium carbonate was dissolved in purified water to prepare 2000 ml of a solution. The resultant aqueous sodium carbonate solution was gradually added to the aqueous metallic nitrate solution with stirring to form a precipitate. When the pH value reached 7, the addition of the aqueous sodium carbonate solution was stopped. In this state, the stirring was continued for additional one hour to mature the precipitate. Thereafter, the precipitate was collected by filtration to obtain a precipitate cake.

The cake was washed several times with a 1 wt.% aqueous ammonium bicarbonate solution to remove sodium and then dried at 110° C. for 24 hours. The dried cake was pulverized and fired at 400° C. for one hour in the air. The powder as fired was molded into a tablet having a size of 5 mmφ×5 mm. The molded article was crushed to a size of about 2 to 3 mm, packed into a sorption desulfurization tube, heated in a hydrogen stream with caution so as not to cause heat buildup and reduced at 200° C. for 16 hours.

The desulfurizing agent thus produced comprised 10% by weight of Cu, 30% by weight of Ni, 50% by weight of ZnO and 10% by weight of $Al_2O_3$ and had a surface area of 95 m²/g.

The hydrodesulfurized kerosene produced in the item (3) of Example 1 was desulfurized with this sorption-desulfurizing agent. The desulfurization conditions were the same as those described in the item (4) of Example 1. The sulfur content in the kerosene at the outlet of the tube was lower than the detection limit (0.05 ppm) in a period from the initiation of the passing of the kerosene through the tube to 3300 hours after the initiation of the passing of the kerosene through the tube. Thereafter, the sulfur content gradually increased and amounted to about 0.1 ppm about 7800 hours after the initiation of the passing of the kerosene through the tube.

COMPARATIVE EXAMPLE 3

Purified water was incorporated with 4.0 g of copper nitrate, 168 g of nickel nitrate, 90.0 g of zinc nitrate and 77.3 g of aluminum nitrate to prepare 1000 ml of a solution. Separately, 105 g of sodium carbonate was dissolved in purified water to prepare 2000 ml of a solution. The resultant aqueous sodium carbonate solution was gradually added to the aqueous metallic nitrate solution with stirring to form a precipitate. When the pH value reached 7, the addition of the aqueous sodium carbonate solution was stopped. In this state, the stirring was continued for additional one hour to mature the precipitate. Thereafter, the precipitate was collected by filtration to obtain a precipitate cake.

The cake was washed several times with a 1 wt.% aqueous ammonium bicarbonate solution to remove sodium and then dried al; 110° C. for 24 hours. The dried cake was pulverized and fired at 400° C. for one hour in the air. The powder as fired was molded into a tablet having a size of 5 mmφ×5 mm. The molded article was crushed to a size of about 2 to 3 mm, packed into a sorption desulfurization tube, heated in a hydrogen stream with caution so as not to cause heat buildup and reduced at 200° C. for 16 hours.

The comparative desulfurizing agent thus produced consisted of 1.5% by weight of Cu, 48.5% by weight of Ni, 35% by weight of ZnO and 15% by weight of $Al_2O_3$ and had a surface area of 63 m²/g. This comparative desulfurizing agent had the copper to nickel weight ratio (in terms of metals) of 3:97.

The hydrodesulfurized kerosene produced in the item (3) of Example 1 was desulfurized with this comparative desulfurizing agent. The desulfurization conditions were the same as those described in the item (4) of Example 1.

The pressure drop in the catalyst bed began to increase from about 100 hours after the initiation of the passing of the kerosene through the tube, and amounted to 1 kg/cm² 350 hours after the above initiation. At this point of time, the reaction was ceased. During the operation, the sulfur content in the kerosene at the outlet of the tube was lower than the detection limit (0.05 ppm).

As is apparent from the result of Comparative Example 3 mentioned above, even if a desulfurizing agent comprising an alloy of nickel with copper was used, the deposition of carbon was not sufficiently inhibited when the desulfurizing agent used had a proportion of copper in the above alloy of less than 20% by weight.

COMPARATIVE EXAMPLE 4

The procedure of Comparative Example 3 was followed except that the amounts of copper nitrate, nickel nitrate, zinc nitrate and aluminum nitrate used as raw materials were substituted for 42.6 g, 48.6 g, 141 g and 77.3 g, respectively.

The comparative desulfurizing agent thus produced consisted of 16% by weight of Cu, 14% by weight of Ni, 55% by weight of ZnO and 15% by weight of $Al_2O_3$ and had a surface area of 82 m²/g. This comparative desulfurizing agent had the total content of copper and nickel of 30% by weight.

The hydrodesulfurized kerosene produced in the item (3) of Example 1 was desulfurized with this comparative desulfurizing agent. The desulfurization conditions were the same as those described in the item (4) of Example 1.

The sulfur content in the kerosene at the outlet of the tube was lower than the detection limit (0.05 ppm) in a period from the initiation of the passing of the kerosene through the tube to 1200 hours after the initiation of the passing of the kerosene through the tube. Thereafter, the sulfur content gradually increased and amounted to about 0.1 ppm about 3000 hours after the initiation of the passing of the kerosene through the tube.

COMPARATIVE EXAMPLE 5

The procedure of Comparative Example 3 was followed except that the amounts of copper nitrate, nickel nitrate, zinc nitrate and aluminum nitrate used as raw materials were substituted for 21.3 g, 24.3 g, 179 g and 77.3 g, respectively.

The comparative desulfurizing agent thus produced consisted of 8% by weight of Cu, 7% by weight of Ni, 70% by weight of ZnO and 15% by weight of $Al_2O_3$ and had a surface area of 102 m²/g. This comparative desulfurizing agent had the total content of copper and nickel of 15% by weight.

The hydrodesulfurized kerosene produced in the item (3) of Example 1 was desulfurized with this comparative desulfurizing agent. The desulfurization conditions were the same as those described in the item (4) of Example 1.

The sulfur content in the kerosene at the outlet of the tube was lower than the detection limit (0.05 ppm) in a period from the initiation of the passing of the kerosene through the tube to 800 hours after the initiation of the passing of the kerosene through the tube. Thereafter, the sulfur content gradually increased and amounted to about 0.1 ppm about 2000 hours after the initiation of the passing of the kerosene through the tube.

As is apparent from the results of Comparative Examples 4 and 5 mentioned above, even if a desulfurizing agent comprising an alloy of nickel with copper was used, the desulfurizing agent was insufficient in the service life thereof when the desulfurizing agent used had a total content of copper and nickel in terms of metals of less than 40% by weight.

COMPARATIVE EXAMPLE 6

Purified water was incorporated with 26.6 g of copper nitrate and 104 g of nickel nitrate to prepare 500 ml of a solution. Separately, 105 g of sodium carbonate was dissolved in purified water to prepare 2000 ml of a solution. The resultant aqueous sodium carbonate solution was gradually added to the aqueous metallic nitrate solution with stirring to form a precipitate. When the pH value reached 7, the addition of the aqueous sodium carbonate solution was stopped. In this state, the stirring was continued for additional one hour to mature the precipitate. Thereafter, the precipitate was collected by filtration to obtain a precipitate cake.

The cake was washed several times with a 1 wt.% aqueous ammonium bicarbonate solution, and then incorporated with 42 g of superstable zeolite Y (lattice constant: 24.50A, $Na_2O$ content: 0.3 wt.%) to obtain a mixture. The mixture was kneaded and then dried at 110° C. for 24 hours. The dried mixture was pulverized and fired at 400° C. for one hour in the air. The powder as fired was molded into a tablet having a size of 5 mmϕ×5 mm. The molded article was crushed to a size of about 2 to 3 mm, packed into a sorption desulfurization tube, heated in a hydrogen stream with caution so as not to cause heat buildup and reduced at 200° C. for 16 hours.

The comparative desulfurizing agent thus produced consisted of 10% by weight of Cu, 30% by weight of Ni and 60% by weight of zeolite and had a surface area of 330 m²/g. This comparative desulfurizing agent comprised zeolite as the carrier on which copper and nickel were supported.

The hydrodesulfurized kerosene produced in the item (3) of Example 1 was desulfurized with this comparative desulfurizing agent. The desulfurization conditions were the same as those described in the item (4) of Example 1.

The sulfur content in the kerosene at the outlet of the tube was 0.3 ppm from the initiation of the passing of the kerosene through the tube, and amounted to 1.0 ppm 1000 hours after the initiation of the passing of the kerosene.

As is apparent from the result of Comparative Example 6 mentioned above, even if a desulfurizing agent comprising an alloy of nickel with copper was used, the desulfurizing agent was insufficient in the desulfurizing capability when the carrier used was zeolite.

What is claimed is:

1. A process of producing a fuel gas for fuel cells, which consists of the steps of:
    a) treating kerosene having a sulfur content not higher than 5 ppm with a desulfurizing agent at a temperature of 300–400° C., a pressure of from atmospheric pressure to 10 kg/cm² G and a liquid hourly space velocity value of 0.1–1, to reduce the sulfur content of said treated kerosene to 0.2 ppm or less and
    b) contacting said treated kerosene from step a) with a steam reforming catalyst under the conditions of a catalyst bed inlet temperature of 400–500° C., a catalyst bed outlet temperature of 700–800° C., a pressure of from atmospheric pressure to 10 kg/cm² G and a liquid hourly space velocity value of 0.1–1, to provide a fuel gas mainly composed of hydrogen, said desulfurizing agent in step a) comprising a copper-nickel alloy having a copper to nickel ratio by weight of 80:20 to 20:80 and at least one carrier selected from the group consisting of $AL_2O_3$, ZnO and MgO, the total content of copper and nickel in terms of metals in said desulfurizing agent being in the range of 40 to 70% by weight.

2. The process according to claim 1, wherein said desulfurizing agent has a particle diameter of 0.5–10 mm.

3. The process according to claim 1, wherein said desulfurizing agent has a bulk density of 0.5–2 g/ml.

4. The process according to claim 1, wherein said desulfurizing agent has a surface area of 10–400 m²/g.

5. The process according to claim 1, wherein said desulfurizing agent has a pore volume of 0.1–1.5 ml/g.

6. The process according to claim 1, wherein said kerosene is treated with said desulfurizing agent in step a) under the conditions of hydrogen to kerosene ratio of 100 ml/g.

7. The process according to claim 1, wherein the fuel gas produced contains 60–80% by volume of hydrogen and 10–30% by volume of carbon monoxide.

8. The process according to claim 1, wherein said desulfurizing agent in step a) comprises 10–22% by weight of Cu, 21–30% by weight of Ni, 46–50% by weight of ZnO and 10–11% by weight of $Al_2O_3$ and the surface area is 95–98 m²/g.

9. The process according to claim 1, wherein said steam reforming catalyst comprises at least one of ruthenium and rhodium.

10. A process of producing a fuel gas for fuel cells, which consists of the steps of:

a) hydrodesulfurizing kerosene having a sulfur content higher than 5 ppm in the presence of a Ni-Mo- or Co-Mo- based catalyst at a temperature of 300–400° C., a pressure of 10–100 kg/cm² G and a liquid hourly space velocity of 0.1–1, to reduce the sulfur content to 5 ppm or less of said hydrodesulfurized kerosene, then b) treating said hydrodesulfurized kerosene from step a) with a desulfurizing agent which comprises a copper-nickel alloy having a copper to nickel ratio by weight of 80:20 to 20:80 and at least one carrier selected from the group consisting of $Al_2O_3$, ZnO and MgO, and the total content of copper and nickel in terms of metals in said desulfurizing agent being in the range of 40 to 70% by weight at a temperature of 300–400° C., a pressure of from atmospheric pressure to 10kg/cm² G and a liquid hourly space velocity of 0.1–1, to reduce the sulfur content to 0.2 ppm or less, and then c) contacting said treated kerosene from step b) with a steam reforming catalyst under the conditions of a catalyst bed inlet temperature of 400–500° C., a catalyst bed outlet temperature of 700–800° C., a pressure of from atmospheric pressure to 10kg/cm² G and a liquid hourly space velocity of 0.1–1, to provide a fuel gas mainly composed of hydrogen.

11. The process according to claim 10, wherein said desulfurizing agent has a particle diameter of 0.5–10 mm.

12. The process according to claim 10, wherein said desulfurizing agent has a bulk density of 0.5–2 g/ml.

13. The process according to claim 10, wherein said desulfurizing agent has a surface area of 10–400 m²/g.

14. The process according to claim 10, wherein said desulfurizing agent has a pore volume of 0.1–1.5 ml/g.

15. The process according to claim 10, wherein said kerosene is treated with said desulfurizing agent in step b) under the condition of hydrogen to kerosene ratio of 100 ml/g.

16. The process according to claim 10, wherein the fuel gas produced contains 60–80% by volume of hydrogen and 10–30% by volume of carbon monoxide.

17. The process according to claim 10, wherein said desulfurizing agent in step b) comprises 10–22% by weight of Cu, 21–30% by weight of Ni, 46–50% by weight of ZnO and 10–11% by weight of $Al_2O_3$ and the surface area is 95–98 m²/g.

18. The process according to claim 10, wherein said steam reforming catalyst comprises at least one of ruthenium and rhodium.

19. The process according to claim 1, wherein said kerosene is treated with said desulfurizing agent in step a) at a temperature of 380–400° C., a pressure of from atmospheric pressure to 10 kg/cm² 7805 G and a LHSV of 0.1–1.

20. The process according to claim 1, wherein said fuel gas is produced for 5,000 hours or more.

21. The process according to claim 10, wherein said fuel gas is produced for 5,000 hours or more.

* * * * *